(12) United States Patent
Yuan (10) Patent No.: US 12,464,144 B2
(45) Date of Patent: Nov. 4, 2025

(54) METHOD FOR IDENTIFYING STATIONARY REGIONS IN FRAMES OF A VIDEO SEQUENCE

(71) Applicant: Axis AB, Lund (SE)

(72) Inventor: Song Yuan, Lund (SE)

(73) Assignee: Axis AB, Lund (SE)

( * ) Notice: Subject to any disclaimer, the term of this patent is extended or adjusted under 35 U.S.C. 154(b) by 256 days.

(21) Appl. No.: 17/720,528

(22) Filed: Apr. 14, 2022

(65) Prior Publication Data

US 2022/0377355 A1 Nov. 24, 2022

(30) Foreign Application Priority Data

May 20, 2021 (EP) .................................. 21174922

(51) Int. Cl.
*H04N 19/20* (2014.01)
*G06V 10/22* (2022.01)
*G06V 20/40* (2022.01)
*H04N 19/103* (2014.01)
*H04N 19/12* (2014.01)
*H04N 19/139* (2014.01)
*H04N 19/157* (2014.01)
*H04N 19/167* (2014.01)
(Continued)

(52) U.S. Cl.
CPC ............ *H04N 19/20* (2014.11); *G06V 10/22* (2022.01); *G06V 20/41* (2022.01); *H04N 19/103* (2014.11); *H04N 19/12* (2014.11); *H04N 19/139* (2014.11); *H04N 19/157* (2014.11); *H04N 19/167* (2014.11); *H04N 19/176* (2014.11); *H04N 19/182* (2014.11)

(58) Field of Classification Search
CPC ...... H04N 19/176; H04N 19/70; H04N 19/52; H04N 19/117; H04N 19/137; H04N 19/147; H04N 19/186; H04N 19/136; H04N 19/14; H04N 19/139; H04N 19/107; H04N 19/80; H04N 19/142
See application file for complete search history.

(56) References Cited

U.S. PATENT DOCUMENTS

2014/0072035 A1   3/2014   Rabii
2018/0061199 A1*  3/2018   Sakomizu ............ H04N 19/115

OTHER PUBLICATIONS

Extended European Search Report dated Nov. 11, 2021 for European Patent Application No. 21174922.1.
(Continued)

*Primary Examiner* — Farhan Mahmud
(74) *Attorney, Agent, or Firm* — Volpe Koenig (57) ABSTRACT

A method for identifying stationary regions in frames of a video sequence comprises receiving an encoded version of the video sequence, wherein the encoded version of the video sequence includes an intra-coded frame followed by a plurality of inter-coded frames; reading coding-mode information in the inter-coded frames of the encoded version of the video sequence, wherein the coding-mode information is indicative of blocks of pixels in the inter-coded frames being skip-coded; finding, using the read coding-mode information, one or more blocks of pixels that each was skip-coded in a respective plurality of consecutive frames in the encoded version of the video sequence; and designating each found block of pixels as a stationary region in the respective plurality of consecutive frames.

18 Claims, 5 Drawing Sheets

(51) Int. Cl.
*H04N 19/176* (2014.01)
*H04N 19/182* (2014.01)

(56) References Cited

OTHER PUBLICATIONS

You et al., "Real-time detection and tracking of multiple objects with partial decoding in H.264/AVC bitstream domain," (2012).
Sun et al., "Region of interest extraction and virtual camera control based on panoramic video capturing," in IEEE Transactions on Multimedia, vol. 7, No. 5, pp. 981-990, (Oct. 2005).
Sikora, "MPEG Digital Video-Coding Standards—Delivering Picture Perfect Compression for Storage,. Transmission, and Multimedia Applications," in IEEE Signal Processing Magazine, vol. 14, No. 5, pp. 82-100, (Sep. 1997).
Kaup, "Object-based texture coding of moving video in MPEG-4," in IEEE Transactions on Circuits and Systems for Video Technology, vol. 9, No. 1, pp. 5-15, (Feb. 1999).
Zhu et al., "Application of Visual Saliency in the Background Image Cutting for Layout Design," In: Meiselwitz, G. (eds) Social Computing and Social Media. Design, Ethics, User Behavior, and Social Network Analysis. HCII 2020. Lecture Notes in Computer Science(), vol. 12194. Springer, Cham., pp. 168-183 (2020).

\* cited by examiner

METHOD FOR IDENTIFYING STATIONARY REGIONS IN FRAMES OF A VIDEO SEQUENCE

FIELD OF INVENTION

The present disclosure relates to a method and a device for identifying stationary regions in frames of a video sequence. It also relates to a non-transitory computer-readable medium having stored thereon computer code instructions adapted to carry out the method.

TECHNICAL BACKGROUND

Today, surveillance cameras find extensive use, generating copious amounts of video data. Often, there is a need to determine whether an image region is unchanged, and for how long. Conventionally, such analysis is performed through image analysis algorithms working on decoded video frames. If analysing large amounts of data, such analysing may require considerable amounts of processing power, which might not be available, or be expensive. There is thus a need for improvements in this context.

SUMMARY

In view of the above, an objective of the disclosure is to solve or at least reduce one or several of the drawbacks discussed above.

According to a first aspect of the present disclosure there is provided a method for identifying stationary regions in frames of a video sequence, the method comprising receiving an encoded version of the video sequence, wherein the encoded version of the video sequence includes an intra-coded frame followed by a plurality of inter-coded frames; reading coding-mode information in the inter-coded frames of the encoded version of the video sequence, wherein the coding-mode information is indicative of blocks of pixels in the inter-coded frames being skip-coded; finding, using the read coding-mode information, one or more blocks of pixels that each was skip-coded in a respective plurality of consecutive frames in the encoded version of the video sequence; and designating each found block of pixels as a stationary region in the respective plurality of consecutive frames.

"Encoded version of the video sequence" should be understood as known in the field of video coding, which may, for example, entail the image frames of the video sequence being represented in a bitstream, possibly as compressed.

With "coding-mode information" should be understood any information provided in the encoded version of the video stream. Therefore, "coding-mode information" and "encoded information" may be regarded as synonyms.

As a "block of pixels" should be understood a set of pixels of an image frame that may be encoded in the encoded version of the video stream. For example, the block of pixels may comprise a set of luma samples and/or a set of chroma samples, corresponding to the pixels of the block of pixels. For example, a block of pixels may correspond to a "macroblock", as generally known in the field of video coding.

"Skip-coding", "skip-coded" and the like should be understood as generally known in the field of video coding and video coding standards. For example, "skip-coding" may include an indication in the encoded version of the video stream that the one or more blocks of pixels, such as one or more macroblocks, should be decoded as "skipped".

A skip-coded block may also be referred to as an "empty" block. A skip-coded block may be an "empty P block".

"Intra-coded frame" should be understood as a frame encoded with reference only to other parts of the same frame, as generally known in the field of video coding. For example, the intra-coded frame may be an "I" frame.

"Inter-coded frame" should be understood as a frame encoded with possible reference one or more different frames, as generally known in the field of video coding. For example, the inter-coded frame may be an "P" frame or a "B" frame.

As a "stationary region" should be understood a region not having changed since an immediately preceding frame of the video sequence The encoded version of the video sequence including an intra-coded frame followed by a plurality of inter-coded frames may, for example, be a group of pictures (GOP), as known in the field of video coding.

The present disclosure stems from a realization that a block of pixels having been skip coded in a plurality of consecutive frames are likely to correspond to stationary regions in the video sequence. Through the designating of stationary regions, based on the coding-mode information indicative of blocks of pixels in the inter-coded frames being skip-coded, the regions can be designated as stationary without necessarily needing either to fully decode, or to perform image analysis of, the corresponding inter-coded frames of the encoded version of the video sequence, as will be further explained in the following.

Furthermore, typically, the full decoding of an encoded video bitstream may involve, firstly, so-called "unpacking" of the corresponding bitstream, where the content of the bitstream may be de-serialized, i.e., the individual items of the bitstream are parsed and may, for example, be read into variables of volatile memory. In one or more further decoding steps, the data thus de-serialized may be processed, involving, for example, the interpretation of motion vectors and other approaches used for encoding blocks of pixels, eventually resulting in decoded image frames comprising the actual blocks of pixels in the form of, e.g., chroma and luma samples. Typically, these one or more further steps are much more processor intensive than the unpacking.

Typically, the coding-mode information indicative of blocks of pixels in the inter-coded frames being skip-coded is directly available without further processing, already after unpacking, and therefore no further decoding and/or processing is needed to be able to designate a region as stationary. Hereby, processing power is saved. This is particularly beneficial with long intervals between the intra-coded frames, e.g., "I" frames, as common in surveillance camera applications, since then no image analysis is needed during the long sequence of inter-coded frames, e.g., a long GOP, until the next intra-coded frame, while it still being possible to conclude that no motion has occurred during that sequence of inter-coded frames.

The method may further comprise analysing video data in the frames of the video sequence to detect motion and/or identify foreground objects, wherein the stationary regions of the frames are excluded from the analysing.

Hereby, through excluding from the analysing the regions designated as stationary, available processing power spending may be directed towards regions likely to have changed. For example, this may allow for only needing to decode the intra-coded frame of the video sequence and/or only the parts of the inter-coded frames not corresponding to the regions designated as stationary. This allows for better usage of available resources and/or saved expense on processing power.

The method may further comprise maintaining one or more timers, each timer corresponding to a designated stationary region, the timer being an indication of how many consecutive frames before and including a present inter-coded frame said block of pixels was skip-coded.

This provides for a way of keeping track of how long regions have remained stationary, while still only requiring modest processing power.

The maintaining one or more timers may comprise incrementing the timer corresponding to a designated stationary region if the corresponding block of pixels that was skip-coded in an immediately preceding inter-coded frame is found to be skip-coded in the present inter-coded frame.

This is a particularly simple way of implementing the timer. The maintaining one or more timers may comprise resetting the timer corresponding to a designated stationary region if the corresponding block of pixels that was skip-coded in an immediately preceding inter-coded frame is not found to be skip-coded in the present inter-coded frame.

The method may further comprise defining, with respect to one or more of the frames of the video sequence, a region of the intra-coded frame comprising an object of interest; finding one or more designated stationary regions, each designated stationary region being at least partially located within the region comprising the object of interest; and designating the object of interest as a stationary object.

Optionally, the defining of the region comprising the object of interest may be based on object detection in a decoded frame of the video sequence.

As commonly denoted in the art, an "object of interest" may be any object located in a frame of the video sequence. It may for example be, but not necessarily be limited to, an object of special significance to a user and/or viewer of the video sequence, an operator, an image analytics process, or the like. The region comprising the object of interest may, for example, by defined based on an automatic object detection process, algorithm, or the like. In another example, the region comprising the object of interest may be manually defined by an operator reviewing one or more frames of the video sequence, either as part of a live stream, or as part of a recording.

As per the above, regions of the frame may be designated as stationary based on the coding-mode information. Through the finding of the one or more designated stationary regions being at least partially located within the region comprising the object of interest, this information may be used with regard to the object of interest, where it can be concluded that the object of interest has not moved, with some degree of certainty, and the object of interest can be identified as a stationary object.

This allows the identification of stationary objects without the need to perform image analysis on the inter-coded frames, or even fully decode the inter-coded frames, since, using information from the designated stationary regions, it can be concluded that the objects in question are likely to be stationary. This allows for better usage of available resources and/or saved expense on processing power.

In cases where it is important that no actually-stationary object is missed, one may require, as per the above, that, only, at least one designated stationary region at least partially is located within the region comprising the object of interest. Alternatively, if a high degree of certainty that an object is stationary is required, and it is acceptable that some actually stationary objects may be missed, one may require that the entire region comprising the object of interest must be covered by one or more designated stationary regions. Approaches therebetween are equally possible, such as requiring a certain fraction of the region comprising the object of interest being covered by one or more designated stationary regions. Depending on the degree of certainty required for the object of interest actually being stationary, one may adjust that fraction. Alternatively, one may require that a predetermined number of designated stationary regions are at least partially located within the region comprising the object of interest.

Optionally, the object of interest may be designated as a stationary object on a condition that the respective timer corresponding to each designated stationary region exceeds a predefined threshold. As "stationary object" may then be understood an object that has not substantially moved during the duration of the timer.

The method may further comprise decoding a frame of the encoded version of the video sequence, wherein the defining of the region comprising the object of interest is performed with respect to the decoded frame, optionally based on object detection in that frame, and the plurality of consecutive frames corresponding to the designated stationary region directly follows the decoded frame.

The decoded frame may, for example, be the intra-coded frame. However, it may also be an inter-coded frame of the plurality of inter-coded frames.

Hereby, an object of interest as defined with respect to a decoded frame may be designated as stationary without the need to fully decode the succeeding frames, as per the present concept.

The method may further comprise modifying video data of the frames of the video sequence to make video data in the identified stationary regions less salient than video data in other regions, wherein a level of saliency of a block of pixels in a stationary region in a frame of the video sequence is set depending on the timer which is maintained for that block of pixels.

Making the stationary regions less salient, through modifying the video frames, aids an operator in carrying out the task of keeping track of and monitoring video feeds, allowing operator attention to be focused on regions that actually may have changed.

The level of saliency may decrease with increasing value of the timer.

The video data in the stationary regions may be made less salient through reduced luminance, reduced chrominance, and/or reduced opacity.

The reading of the coding-mode information; the finding of the one or more blocks of pixels that each was skip-coded; and the designating of each found block of pixels as a stationary region may be completed sequentially for each inter-coded frame of the plurality of inter-coded frames.

This should be understood as the reading, the finding and the designating being performed in parallel, or in sequence, but being fully completed for one inter-coded frame before moving to the next inter-coded frame.

The designating of a found block of pixels as a stationary region may comprise designating the found block of pixels as a spatial region of the frame in which video data has not changed since an immediately preceding frame of the video sequence.

A skip-coded block of pixels in a frame of the video sequence may be a block of pixels encoded as a copy of a spatially coinciding block of pixels in a preceding frame of the video sequence.

The coding-mode information may be read from blocks of pixels in the inter-coded frames and/or an inter-coded frame header in the encoded version of the video sequence.

According to a second aspect, there is provided a device for identifying stationary regions in frames of a video sequence, the device comprising circuitry configured to receive an encoded version of the video sequence, wherein the encoded version of the video sequence includes an intra-coded frame followed by a plurality of inter-coded frames; read coding-mode information in the inter-coded frames of the encoded version of the video sequence, wherein the coding-mode information is indicative of blocks of pixels in the inter-coded frames being skip-coded; find, using the read coding-mode information, one more blocks of pixels that each was skip-coded in a respective plurality of consecutive frames in the encoded version of the video sequence; and designate each found block of pixels as a stationary region in the respective plurality of consecutive frames.

The second aspect may generally have the same features and advantages as the first aspect.

According to a third aspect, there is provided a non-transitory computer-readable medium having stored thereon computer code instructions adapted to carry out the method of the first aspect when executed by a device having processing capability.

The third aspect may generally have the same features and advantages as the first aspect.

BRIEF DESCRIPTION OF THE DRAWINGS

The above, as well as additional objects, features and advantages of the present disclosure, will be better understood through the following illustrative and non-limiting detailed description of embodiments of the present disclosure, with reference to the appended drawings, where the same reference numerals will be used for similar elements.

DETAILED DESCRIPTION

The present disclosure will now be described more fully hereinafter with reference to the accompanying drawings, in which currently preferred embodiments of the disclosure are shown. This disclosure may, however, be practiced in many different forms within the scope of the claims and should not be construed as limited to the embodiments set forth herein.

Figure 1:
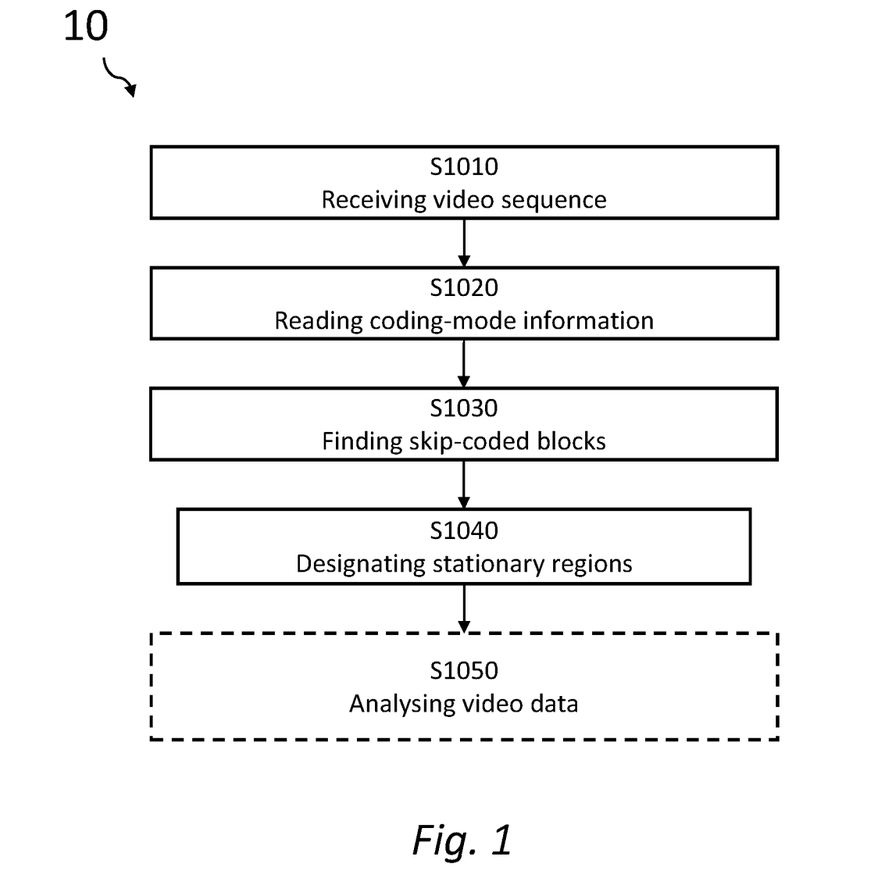
FIG. 1 shows a flowchart of a method example of identifying stationary regions in frames of a video sequence.

FIG. 1 shows a flowchart of a method example 10 of identifying stationary regions in frames of a video sequence.

Figure 5:
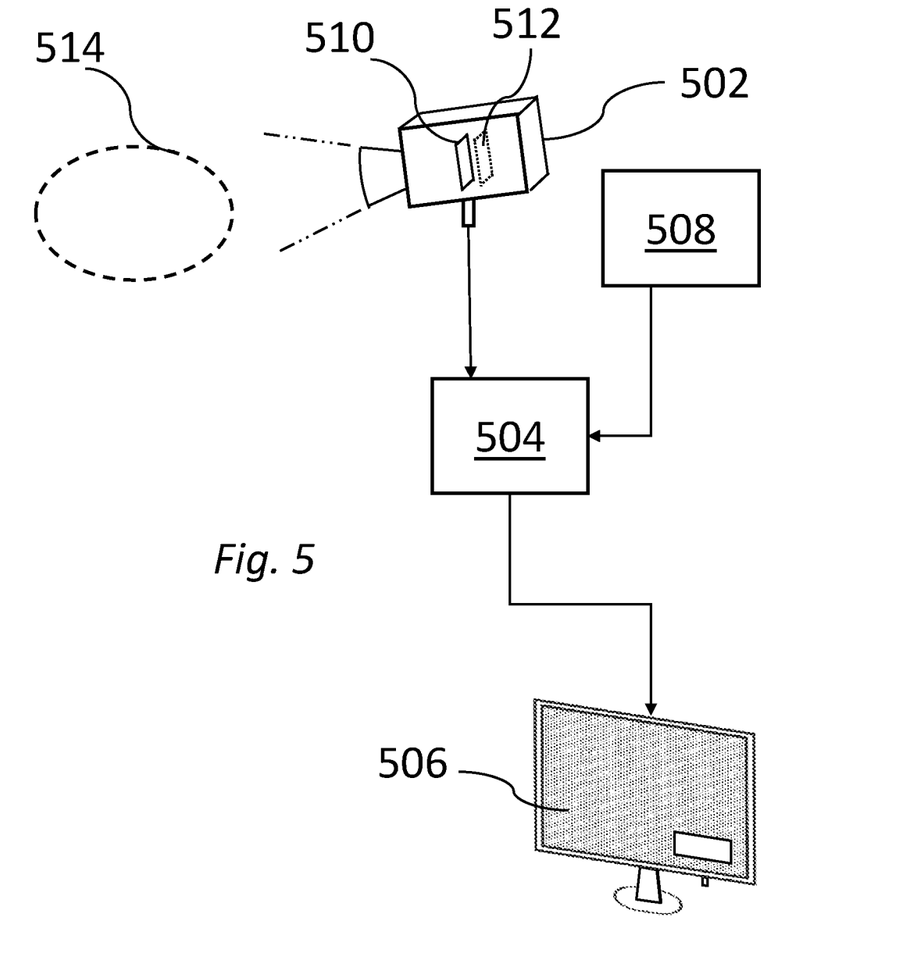
FIG. 5 shows a video processing system and components thereof.

FIG. 5 shows a video processing system and components thereof. A surveillance camera 502 may be aimed at a scene 514 and may be connected to a video processing unit 504 in which the method example 10 (cf. FIG. 1) may be implemented. The video processing unit 504 may be connected to a display 506. Alternatively, the display 506 may be connected to a video client unit (not shown), in turn connected to the video processing unit. A further sensor 508, such as an IR sensor, may also be aimed at the scene 514. Further, optionally, the camera 502 may be a so-called fusion camera having a first sensor 510 and a second 512, which, for example may operate at different wavelength intervals.

Typically, the video processing unit 504 may be connected to several surveillance cameras; for simplicity, only one surveillance camera 502 is shown. The surveillance camera 502 and/or the video client unit may, for example, be directly connected to the video processing unit 504, or logically connected to the video processing unit 504 through a packet-switched network, such as an IP network.

With reference to FIG. 1, at S1010, an encoded version 20 of a video sequence is received. In particular, the encoded version 20 of the video sequence may be received at the video processing unit 504 from the surveillance camera 502 and may depict the scene 514. The video sequence may comprise frames captured at the sensor 510 of the camera 502.

Encoding may have been performed, for example at the surveillance camera 502, or in a separate unit (not shown). The encoding may be have been performed into a bitstream according to a video coding format and/or standard such as, e.g., H.261, H.262, H.263, H.264/AVC, H.265/HEVC, EVC, H.266/VCC, VP8, VP9, or AV1.

Figure 2:
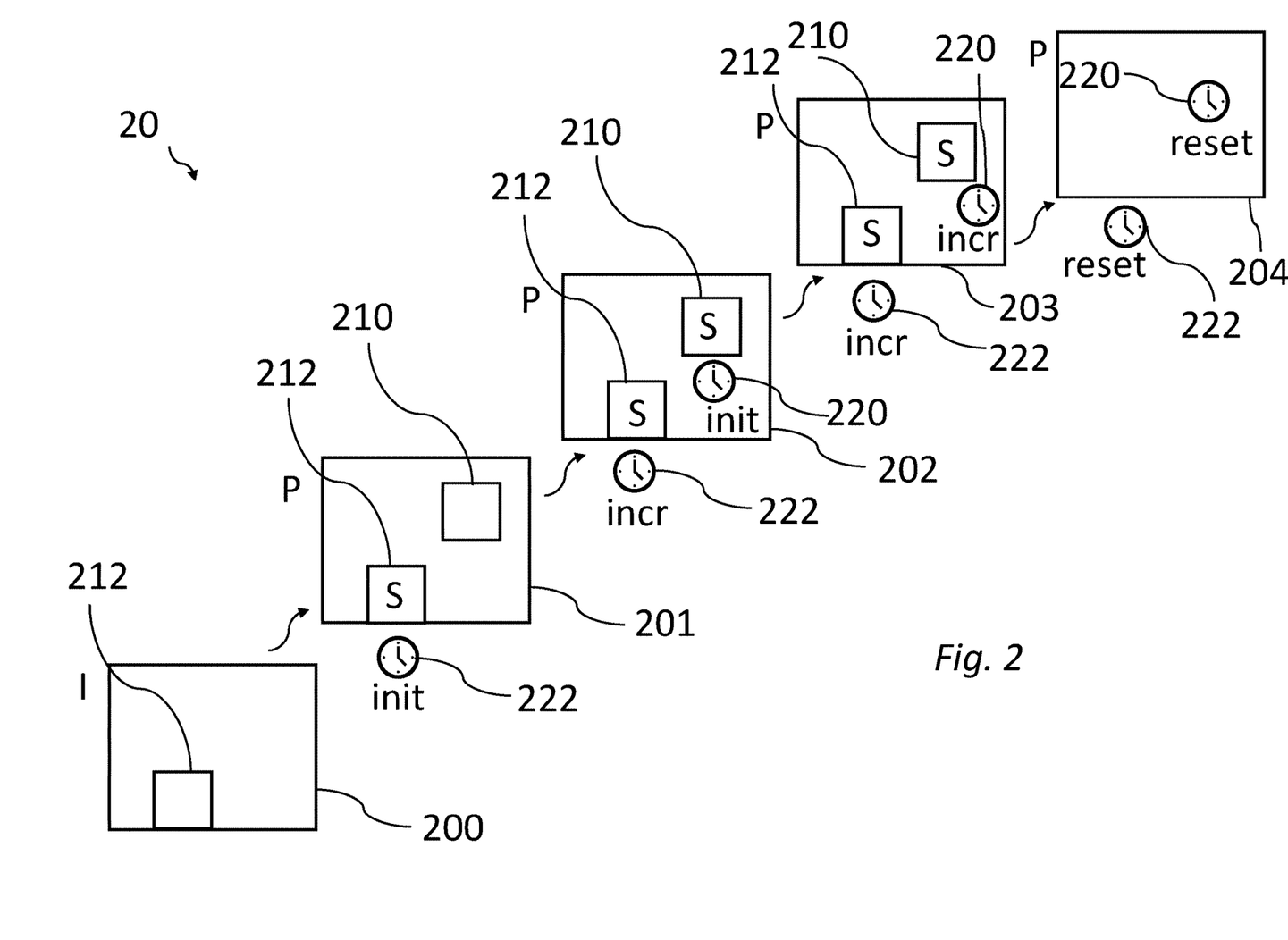
FIG. 2 illustrates a video sequence.

FIG. 2 schematically illustrates an example encoded version 20 of the video sequence. As shown, the example encoded version 20 of the video sequence includes an intra-coded frame 200 (marked "I") followed by a plurality of inter-coded frames (marked "P"), here shown, for illustration only, as four inter-coded frames 201, 202, 203, 204. A first block of pixels 210 and a second block of pixels 212 are schematically shown, as will be detailed below.

Again, with reference to FIG. 1, at S1020, coding-mode information is read from the inter-coded frames of the encoded version of the video sequence, for example at the video processing unit 504 (cf. FIG. 5). The coding-mode information may, for example, be provided in the bitstream format of the relevant video-coding standard.

In particular, the coding-mode information may be indicative of blocks of pixels in the inter-coded frames being skip-coded.

For example, the coding-mode information may be read from blocks of pixels in the inter-coded frames. Thus, such skip-coding, may, for example, take the form of a skip block in the respective frame in the encoded version 20 of the video sequence, as defined in the relevant video coding standard. Alternatively, the skip-coding may be indicated in the frame header, where, for example, a whole frame may be indicated as skip coded, including all blocks of pixels encoded therein.

The reading of the coding-mode information may comprise unpacking the bitstream comprising the inter-coded frames, for example by loading content of the bitstream into non-volatile memory, including the part of the bitstream corresponding to a macro block. Typically, the skip coding of such a block may be indicated as a field in the macro block as encoded and thus available after unpacking, but without any further decoding required.

A skip-coded block of pixels in a frame of the video sequence may be interpreted as a block of pixels encoded as a copy of a spatially coinciding block of pixels in a preceding frame of the video sequence, as shown in FIG. 2 through the corresponding locations in each frame of the blocks of pixels 210 and 212.

In the example of FIG. 2, a block of pixels being skip coded is denoted with an "S".

Again, with reference to FIG. 1, at S1030, for example at the video processing unit 504 (cf. FIG. 5), using the read coding-mode information, one or more blocks of pixels may be found that each was skip-coded in a respective plurality of consecutive frames in the encoded version 20 of the video sequence.

In the example of FIG. 2, the block of pixels 210 is found to be skip coded in two frames, viz., in frames 202 and 203. Similarly, the block of pixels 212 is found to be skip coded in three frames, viz., frames 201, 202, and 203. The block of pixels 210 and the block of pixels 212 each thus being skip coded in a respective plurality of frames, each is found at S1030.

At S1040, for example at the video processing unit 504 (cf. FIG. 5), each found block of pixels 210; 212 at S1030 is designated as a respective stationary region in the respective plurality 202, 203; 201, 202, 203 of consecutive frames. Thus, in the example of FIG. 2, the block of pixels 210 is designated as a stationary region with respect to frames 202 and 203 and the block of pixels 212 is designated as a stationary region with respect to frames 201, 202, and 203. The designating of each found block of pixels 210, 212 as a stationary region may comprise designating the respective found block of pixels 210, 212, as a respective spatial region of the frame in which video data has not changed since an immediately preceding frame of the video sequence.

The reading S1020 of the coding-mode information, the finding S1030 of the one or more blocks of pixels that each was skip-coded and the designating S1040 of each found block of pixels as a stationary region may be completed sequentially for each inter-coded frame 201, 202, 203, 204 of the plurality of inter-coded frames of the encoded version 20 of the video sequence, or alternatively, concurrently.

Optionally, parallel to S1030 and S1040 (FIG. 1), one or more timers may be maintained, for example at the video processing unit 504 (cf. FIG. 5), each timer corresponding to a designated stationary region. One or more of the timers may be stored, for instance for use in later analysis, and/or shown on the display 506 (cf. FIG. 5), either directly, or thorough colour coding, darkening, decolourization, or some other kind of visualization.

Each timer may, for example, be initialized for each block of pixels encoded in the encoded version 20 of the video sequence. In another example, the timer may be initialized for each block of pixels found to be skip-coded in at least one frame. In yet another example, the timer may be initialized when a block of pixels is found to be skip coded in a plurality of frames.

Thus, in the example of FIG. 2, the timer 222, corresponding to the block of pixels 212, may be initialized at frame 201, where the block of pixels 212 is first found to be skip-coded.

Similarly, the timer 220, corresponding to the block of pixels 210 may be initialized at frame 202, where the block of pixels 210 is first found to be skip-coded.

Each timer 220, 222 may thus serve as an indication of how many consecutive frames before and including a present inter-coded frame said block of pixels was skip-coded. Thus, each timer 220, 222 may, for example, count units of time, or the number of frames during which the block of pixels has been skip-coded. In the case of the timer counting units of time, the counted time may, for example, be derived from a number of counted frames, and a frames-per-second value, or equivalent in other units, derived from the video stream.

Each timer 220, 222 may be incremented when the designated stationary region to which it corresponds, in addition to being skip-coded in an immediately preceding inter-coded frame, is found to be skip-coded also in a present inter-coded frame.

Thus, in the example of FIG. 2, at frame 202, with the block of pixels 212 that was skip-coded in the immediately preceding frame 201 also being skip-coded in the present frame 202, the timer 222 is incremented.

Similarly, at frame 202, with the block of pixels 212 that was skip-coded in the immediately preceding frame 201 also being skip-coded in the present frame 202, the timer 222 is incremented. Further, at frame 203, with the with the block of pixels 212 that was skip-coded in the immediately preceding frame 202 also being skip-coded in the present frame 203, the timer 222 is again incremented.

The timer corresponding to a designated stationary region may be reset if the corresponding block of pixels that was skip-coded in an immediately preceding inter-coded frame is not found to be skip-coded in the present inter-coded frame.

Thus, in the example of FIG. 2, at frame 204, the blocks of pixels 210 and 212 are found not to be skip-coded, therefore, each of the timers 220 and 222 are reset.

Again, with reference to FIG. 1, at S1050, optionally, for example at the video processing unit 504 (cf. FIG. 5), video data in the frames of the video sequence 20 may be analysed to detect motion and/or identify foreground objects, using methods known per se. For example, the detection of motion and/or identifying of foreground objects may be performed on decoded video frames and may involve comparing data from several intra-coded and/or inter-coded frames.

Hereby, the stationary regions, designated as such based on the coding-mode information indicating skip-coding, may be excluded from the analysing to detection motion and/or identify foreground objects.

The analysing S1050 may be preceded by a decoding of the intra-coded frame 200, so that the analysing S1050 may be performed, at least in part, on the intra-coded frame 200, as decoded. Further, the analysing S1050 may be performed on previous intra-coded frames, which may have been previously decoded. Thus, the analysing may involve comparing the decoded intra-coded frame 200, as decoded, to one or more decoded previous intra-coded frames.

Further, on encountering a new intra-coded frame in the video sequence, after the intra-coded frame 200 and the plurality of inter-coded frames 201, 202, 203, 204, the new intra-coded frame may be decoded and the analysing S1050 may be updated based on the new intra-coded frame as decoded. Thereafter, the reading of coding-mode information S1020, the finding of skip-coded blocks S1030 and the designating of stationary regions S1040 may be repeated on a new plurality of inter-coded frames following the new intra-coded frame.

Figure 3:
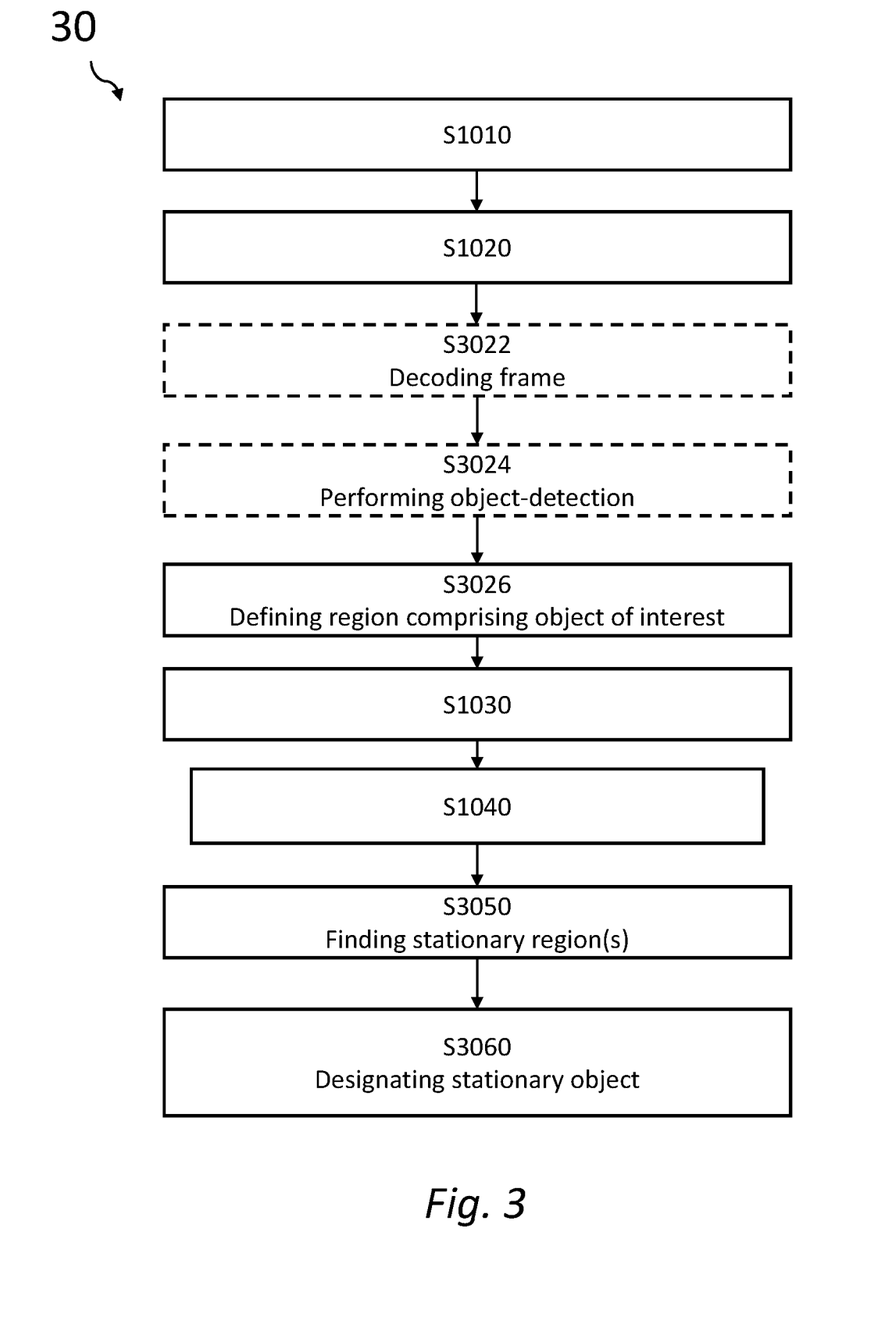
FIG. 3 shows a flowchart for a second method example of identifying stationary regions in frames of a video sequence.

FIG. 3 shows a second method example 30 or identifying stationary regions in frames of a video sequence, comprising further optional steps as compared to the method example 10 of FIG. 1. Just as for the method example 10, the second method example 30 may be implemented in the video processing unit 504 (cf. FIG. 5).

The receiving S1010 of the encoded version of the video sequence and the reading S1020 of the coding-mode information may be performed as described above for the method example 10 in conjunction with FIG. 1.

Figure 4:
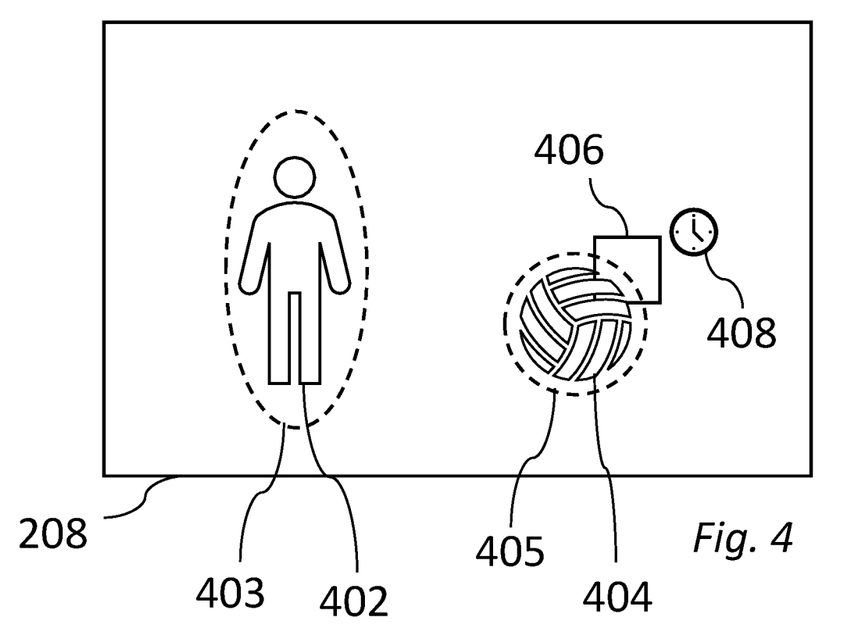
FIG. 4 illustrates a video frame.

Optionally, at S3022, a frame (cf. FIG. 2) of the encoded version 20 of the video sequence may be decoded, for example at the video processing unit 504 (cf. FIG. 5). FIG. 4 shows an example of such a decoded frame 208. As a specific example, FIG. 4 depicts, schematically, a person 402 and a ball 404. The decoded frame 208 may correspond to the intra-coded frame 200 (cf. FIG. 2). Alternatively, the frame 208 may correspond to an inter-coded frame 201, 202, 203, 204 (cf. FIG. 2).

At S3024, optionally, object detection may be performed in a frame of the video sequence. The object detection may optionally be performed with respect to the intra-coded frame 200 and/or an inter-coded frame, as decoded at S3022, and, optionally, also on previous intra-coded frames, which may have been previously decoded. Thus, the object detection may involve comparing the intra-coded frame 200, as decoded, to one or more decoded previous intra-coded frames.

The object detection may, for example, be performed at the video processing unit 504 (cf. FIG. 5).

The object detection may be based on a foreground detection algorithm. Foreground detection algorithms, as known per se in the art, may analyse a sequence of image frames to identify the movement of objects between the image frames. For example, the object detection may involve choosing an existing background model to see what parts of the frame 208 have not changed, involving, e.g., the use of a threshold, or filtering out known changes due to time of day, or image configuration changes such as exposure or gain.

The foreground detection algorithm may thus, for example, compare the intra-coded frame 200 as decoded to one or more previous intra-coded frames. One or more objects 402, 404, being found to have moved may be designated by the foreground detection algorithm as foreground objects. Objects not having moved may, conversely, be designated as background objects.

Alternatively, the object detection may be based on a classification algorithm, as known per se in the art, which may analyse the decoded frame 208, to find detect objects of a certain kind, such as a person 402 (cf. FIG. 4), a ball 404 (cf. FIG. 4), a suitcase, or the like.

Generally, the object detection may be performed using any other method or algorithm known per se in the art.

As shown in FIG. 4, the object detection may result in one or more identified objects, such as the person 402, or the ball 404. In the example of FIG. 4, a found stationary region 406 corresponds to a block of pixels partially located within a region 405 comprising the object 404 of interest, in this example the football 404.

At S3026, at least one region 403, 405 of a frame of the video sequence is defined, each defined region comprising an object 402, 404 of interest. The frame of the video sequence may be the decoded frame 208.

The defining of the at least one region may for example be performed at the video processing unit 504.

The defining of the at least one region may be performed based on the optional object detection at S3024. The region 403, 405, shown schematically in FIG. 4, may generally have any geometric shape. Typically, the object detection may, for example return a bounding box, as known in the art, forming a rectangle comprising the object of interest. The bounding box then constitute the region comprising the object of interest.

Alternatively, for example, the object detection may return a heatmap corresponding to a likelihood of a region corresponding to an object of interest. The region comprising the object of interest may then be generated from a contour line of the heatmap, or a bounding box may then be created based on the heatmap.

Alternatively, the defining of the at least one region may be based on some other data relating to the content of the frame of the video sequence. In one example, the defining may be based on data from an external sensor 508 (cf. FIG. 5), such as an IR detector. In that case, data from the external sensor 508 may give location information of an object of interest, such as a person located in the scene 514 (cf. FIG. 5), and the region of the frame of the video sequence comprising the object of interest may be defined based on that location information.

As another example, the defining of the at least one region 403, 405 may be based on data from a different image sensor 512 (cf. FIG. 5) in the same camera than a sensor from which the frame of the video sequence is based.

The finding S1030 of the one or more blocks of pixels that were skip coded and the designating S1040 of one or more stationary regions may be performed as described above for the method example 10 in conjunction with FIG. 1.

At S3050, the regions 406 designated as stationary at S1040 are evaluated in relation to the regions 403, 405 comprising the objects of interest 402, 404. In particular, it is checked whether each designated stationary region 406 is at least partially located within a region 405, 405 comprising an object of interest 402, 404. If so, at S3060, each such object of interest is designated a stationary region. Optionally such designating may be performed only provided that the plurality of consecutive frames corresponding to the designated stationary region 406 directly follows the decoded frame 208.

Optionally, the designating S3060 of the stationary object may only be performed if each respective timer 408 corresponding to each found designated stationary region exceeds a predefined threshold Optionally, it may be required that the entire region comprising the object of interest must be covered by one or more designated stationary regions, 406. Alternatively, it may, only, be required that at least one designated stationary region 406 at least partially is located within the region comprising the object of interest 402, 404. Alternatively, again, it may be required that a certain fraction of the region comprising the object of interest 403, 405 being covered by one or more designated stationary regions 406, or that a predetermined number of designated stationary regions 406 are at least partially located within the region comprising the object of interest 403, 405.

In the example of FIG. 4, the found stationary region 406 corresponds to a block of pixels partially located within the region 405 comprising the object 404 of interest, in this example the football 404. Therefore, it can be reasonably be concluded that the football 404 is a stationary object, since it is likely that no change has occurred in the area corresponding to the block of pixels 406. Thus, in the example of FIG. 4, the object 404 of interest is designated as a stationary object.

Optionally, the object of interest may be designated as stationary on a condition that the associated timer 408 exceeds the predefined threshold, the threshold ensuring, e.g., that the designed stationary region has been stationary for at least a minimum number of units of time or the number of inter-coded frames.

Optionally, at S3070, video data of the frames of the video sequence may be modified to make video data in the identified stationary regions less salient than video data in other regions. Alternatively, or additionally, such data may be colour coded.

The video data thus modified may, for example, be shown on the display 506 (cf. FIG. 5).

The level of saliency of a block of pixels in a stationary region in a frame of the video sequence may be set depending on the timer which is maintained for that block of pixels. For example, the level of saliency may decrease with increasing value of the timer. Further, for example, the video data in the stationary regions may be made less salient through reduced luminance, reduced chrominance, and/or reduced opacity.

The teachings described above may be computer implemented. For this, a non-transitory computer-readable storage medium may be provided. The non-transitory computer-readable storage medium comprises instructions, stored thereon, for implementing the method example, when executed on a device having processing capabilities.

The non-transitory computer-readable storage medium and/or the device having processing capabilities may be part of or may be connected communicatively, e.g., by electrical and/or wireless connection, to the video processing unit 504. The non-transitory computer-readable storage medium and/or the device having processing capabilities may be physically connected to and/or integrated with the video processing unit 504.

Additionally, variations to the disclosed embodiments can be understood and effected by the skilled person in practicing the claimed disclosure, from a study of the drawings, the disclosure, and the appended claims. For example, apart from the examples already given, method steps for simplicity presented as sequential may also be performed in parallel, and method steps presented as being performed in parallel with other steps may equally be performed in sequence with the same, while still falling within the scope of the appended claims.

The invention claimed is:

1. A method for identifying stationary regions in frames of a video sequence, the method comprising:
   receiving a bitstream comprising an encoded version of the video sequence, wherein the encoded version of the video sequence includes an intra-coded frame followed by a plurality of inter-coded frames;
   reading, from the received bitstream, coding-mode information associated with the plurality of inter-coded frames without fully decoding the frames;
   finding, using the read coding-mode information, one or more blocks of pixels that each was skip-coded in a respective plurality of consecutive frames in the encoded version of the video sequence;
   maintaining a timer for each skip-coded block of pixels, each timer corresponding to a block of pixels and indicating in how many consecutive frames before and including a present inter-coded frame said block of pixels was skip-coded where the timer is reset in response to said block of pixels ceasing to be skip-coded;
   identifying each found block of pixels as a stationary region in the respective plurality of consecutive frames; and
   modifying video data of the frames of the video sequence to make video data in the identified stationary regions less salient than video data in other regions, wherein the video data in the identified stationary regions is made less salient by reducing its luminance, chrominance and/or opacity,
   wherein a level of saliency of a block of pixels in a stationary region in a frame of the video sequence is set depending on the timer which is maintained for that block of pixels, wherein the level of saliency decreases with increasing value of the timer.

2. The method of claim 1, further comprising:
   analysing video data in the frames of the video sequence to detect motion and/or identify foreground objects, wherein the stationary regions of the frames are excluded from the analysing.

3. The method of claim 1, wherein the maintaining comprises incrementing the timer corresponding to a block of pixels if the corresponding block of pixels that was skip-coded in an immediately preceding inter-coded frame is found to be skip-coded in the present inter-coded frame.

4. The method of claim 1, wherein the maintaining comprises:
   resetting the timer corresponding to a block of pixels if the corresponding block of pixels that was skip-coded in an immediately preceding inter-coded frame is not found to be skip-coded in the present inter-coded frame.

5. The method of claim 1, further comprising:
   defining, with respect to one or more of the frames of the video sequence, a region comprising an object of interest;
   finding one or more identified stationary regions, each identified stationary region being at least partially located within the region comprising the object of interest; and
   identifying the object of interest as a stationary object.

6. The method of claim 5, further comprising:
   decoding a frame of the encoded version of the video sequence,
   wherein:
   said defining of said region comprising the object of interest is performed with respect to the decoded frame, and
   the plurality of consecutive frames corresponding to the identified stationary region directly follows the decoded frame.

7. The method of claim 1, wherein:
   the reading of the coding-mode information;
   the finding of the one or more blocks of pixels that each was skip-coded; and
   the identifying of each found block of pixels as a stationary region are completed sequentially for each inter-coded frame of the plurality of inter-coded frames.

8. The method of claim 1, wherein the identifying of a found block of pixels as a stationary region comprises identifying the found block of pixels as a spatial region of the frame in which video data has not changed since an immediately preceding frame of the video sequence.

9. The method of claim 1, wherein the coding-mode information is read from blocks of pixels in the inter-coded frames and/or an inter-coded frame header in the encoded version of the video sequence.

10. A device for identifying stationary regions in frames of a video sequence, the device comprising circuitry configured to:
    receive a bitstream comprising an encoded version of the video sequence, wherein the encoded version of the video sequence includes an intra-coded frame followed by a plurality of inter-coded frames;
    read, from the received bitstream, coding-mode information associated with the plurality of inter-coded frames without fully decoding the frames;
    find, using the read coding-mode information, one or more blocks of pixels that each was skip-coded in a respective plurality of consecutive frames in the encoded version of the video sequence;
    maintain a timer for each skip-coded block of pixels, each timer corresponding to a block of pixels and indicating in how many consecutive frames before and including a present inter-coded frame said block of pixels was skip-coded where the timer is reset in response to said block of pixels ceasing to be skip-coded;

identify each found block of pixels as a stationary region in the respective plurality of consecutive frames; and modify video data of the frames of the video sequence to make video data in the identified stationary regions less salient than video data in other regions, wherein the video data in the identified stationary regions is made less salient by reducing its luminance, chrominance and/or opacity, wherein a level of saliency of a block of pixels in a stationary region in a frame of the video sequence is set depending on the timer which is maintained for that block of pixels, wherein the level of saliency decreases with increasing value of the timer.

11. A non-transitory computer-readable medium having stored thereon computer code instructions adapted to carry out a method for identifying stationary regions in frames of a video sequence when executed by a device having processing capability the method comprising:

receiving a bitstream comprising an encoded version of the video sequence, wherein the encoded version of the video sequence includes an intra-coded frame followed by a plurality of inter-coded frames;

reading, from the received bitstream, coding-mode information associated with the plurality of inter-coded frames without fully decoding the frames;

finding, using the read coding-mode information, one or more blocks of pixels that each was skip-coded in a respective plurality of consecutive frames in the encoded version of the video sequence;

maintaining, a timer for each skip-coded block of pixels, each timer corresponding to a block of pixels and indicating in how many consecutive frames before and including a present inter-coded frame said block of pixels was skip-coded where the timer is reset in response to said block of pixels ceasing to be skip-coded;

identifying each found block of pixels as a stationary region in the respective plurality of consecutive frames; and modifying video data of the frames of the video sequence to make video data in the identified stationary regions less salient than video data in other regions, wherein the video data in the identified stationary regions is made less salient by reducing its luminance, chrominance and/or opacity, wherein a level of saliency of a block of pixels in a stationary region in a frame of the video sequence is set depending on the timer which is maintained for that block of pixels, wherein the level of saliency decreases with increasing value of the timer.

12. The non-transitory computer-readable medium of claim 11, further comprising:

analysing video data in the frames of the video sequence to detect motion and/or identify foreground objects, wherein the stationary regions of the frames are excluded from the analysing.

13. The non-transitory computer-readable medium of claim 11, wherein the maintaining comprises incrementing the timer corresponding to a block of pixels if the corresponding block of pixels that was skip-coded in an immediately preceding inter-coded frame is found to be skip-coded in the present inter-coded frame.

14. The non-transitory computer-readable medium of claim 11, wherein the maintaining comprises:

resetting the timer corresponding to a block of pixels if the corresponding block of pixels that was skip-coded in an immediately preceding inter-coded frame is not found to be skip-coded in the present inter-coded frame.

15. The non-transitory computer-readable medium of claim 11, further comprising:

defining, with respect to one or more of the frames of the video sequence, a region comprising an object of interest;

finding one or more identified stationary regions, each identified stationary region being at least partially located within the region comprising the object of interest; and identifying the object of interest as a stationary object.

16. The non-transitory computer-readable medium of claim 15, further comprising:

decoding a frame of the encoded version of the video sequence, wherein:

said defining of said region comprising the object of interest is performed with respect to the decoded frame, and the plurality of consecutive frames corresponding to the identified stationary region directly follows the decoded frame.

17. The non-transitory computer-readable medium of claim 11, wherein:

the reading of the coding-mode information;

the finding of the one or more blocks of pixels that each was skip-coded; and the identifying of each found block of pixels as a stationary region are completed sequentially for each inter-coded frame of the plurality of inter-coded frames.

18. The non-transitory computer-readable medium of claim 11, wherein the identifying of a found block of pixels as a stationary region comprises identifying the found block of pixels as a spatial region of the frame in which video data has not changed since an immediately preceding frame of the video sequence.

* * * * *